Oct. 13, 1959 H. ERNYEI ET AL 2,908,753

VISUAL TELEVISION TRANSMITTER

Filed Jan. 24, 1955 3 Sheets-Sheet 1

Inventors
Herbert Ernyei
Paul Simond-Cote
By Ralph B. Stewart
attorney

Oct. 13, 1959 H. ERNYEI ET AL 2,908,753

VISUAL TELEVISION TRANSMITTER

Filed Jan. 24, 1955 3 Sheets-Sheet 2

Inventors
Herbert Ernyei
Paul Simond-Cote
By Ralph B. Stewart
attorney

Oct. 13, 1959 H. ERNYEI ET AL 2,908,753

VISUAL TELEVISION TRANSMITTER

Filed Jan. 24, 1955

3 Sheets-Sheet 3

Inventors
Herbert Ernyei
Paul Simond-Cote
By Ralph B. Stewart
attorney

United States Patent Office
2,908,753
Patented Oct. 13, 1959

2,908,753

VISUAL TELEVISION TRANSMITTER

Herbert Ernyei and Paul Simond-Cote, Paris, France, assignors to Societe Nouvelle de l'Outillage R.B.V. et de la Radio-Industrie, Paris, France Application January 24, 1955, Serial No. 483,668

Claims priority, application France January 23, 1954

6 Claims. (Cl. 178—7.1)

The present invention is related to visual television transmitter and more particularly to an arrangement for stablizing the blanking level in the radiated television signal. As is well known, the radiated visual television signal is submitted to government regulations. The modulated television carrier wave is shown on Figure 1 curve A. It consists mainly in video informations such as shown at 1, 2, 3, etc., which modulate negatively the amplitude of the carrier wave. This means that white spots of the picture correspond to the lowest carrier amplitude, while black spots correspond to the higher carrier amplitude shown on the picture as reference black level 4. This reference black level should correspond to 60% of the peak power of the transmitter. The radiated signal comprises also synchronizing pulses such as 5, 6, etc., which are added to a reference carrier level known as blanking level, shown as 7 on curve $1_A$. Before and after the synchronizing pulses, the video signal shows two constant level porches during which the signal amplitude is equal to the blanking level. Government regulations specify also that the blanking level shall always correspond to a specific power level regardless of the changes in the picture brightness. Owing to the fact that the amplitude of the synchronizing pulses is also regulated, this means that the tips of the pulses correspond to a constant level during the transmission. This constant level is shown at 8 on cure $1_A$ and corresponds nearly to the peak power of the transmitter.

Figure 1:
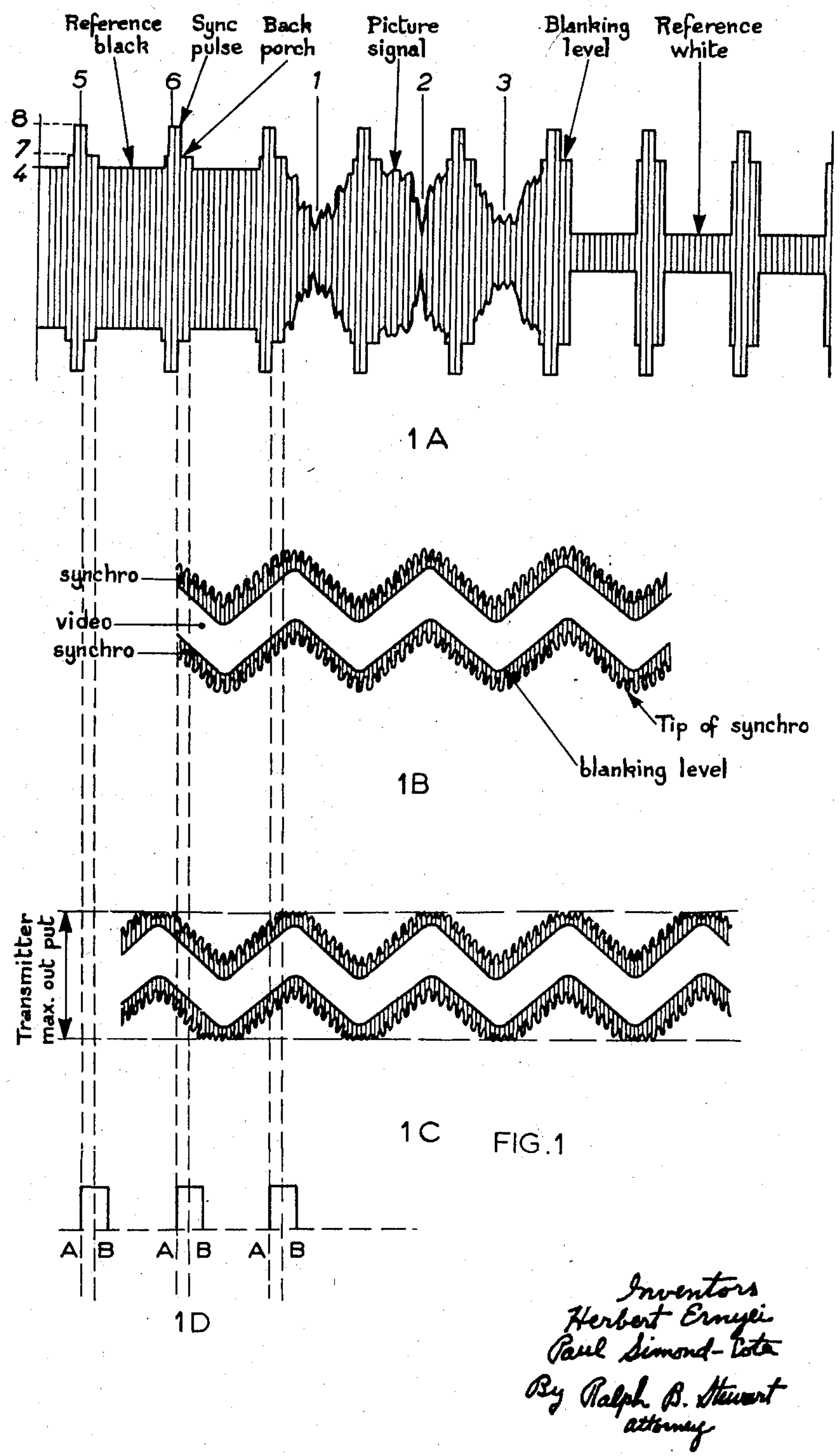

The process of bringing all the synchronizing signal peaks to a common reference level amounts to reinserting the D.C. component in the radiated signal. To obtain a correct radiated signal, it is necessary that the carrier wave should be absolutely free of any amplitude modulation such as may result from hum or any other faulty operation either of the video circuit or of the carrier frequency channel. It is actually very difficult to obtain a modulated television carrier wave absolutely free of any spurious signal and especially of humming. Curve $1_B$ of Figure 1 shows the same modulated carrier wave to which is added a slight amplitude modulation at sixty cycles (hum). To make this modulation visible, it is necessary to use a different time scale from that of curve $1_A$ owing to the very slow amplitude modulation corresponding to hum. After rectification of the radiated signal such as shown on cure $1_B$, the video signal which is obtained is no longer in accordance with the regulations since the tip synchronizing pulse level 8, the blanking level 7, and the black level 4 are no longer constant. These levels are amplitude modulated according to the spurious 60 cycles signal. This amplitude modulation of the carrier wave may be compensated by negative feedback, by means of a signal obtained by peak detection of the radiated signal, said negative feedback controlling either the carrier channel or the video channel after D.C. reinsertion. However, this amplitude modulation of the carrier wave may produce a corresponding amplitude distortion of the synchronizing pulses which correspond to a wrong ration of video signal to synchronizing signal amplitude, if there is no extra power in store at the transmitter. The influence of this type of distortion on the video signal is shown on curve $1_C$ of Figure 1. To obtain a correction of this effect, it is possible to use negative feedback to control the ratio of video amplitude to synchronizing pulse amplitude at a stabilizing amplifier. Owing to the fact that the peak power of the transmitter is constant, a compression of the video signal will appear at the white levels which is most detrimental to the contrast rendition of the picture and to its quality.

The use of negative feedback does not provide means to compensate for white level compression. On the other hand, such a negative feedback is always rather difficult to establish owing to the very low frequency of the control signals. To obtain an accurate feedback, it is necessary to provide a feedback loop in which all the voltage supplies are perfectly well stabilized. This leads to cumbersome and expensive networks. To provide for a correct control of the feedback, it would be necessary that the control signals should include the D.C. component, that is an absolute measurement of the black level with respect to zero carrier amplitude. Transmission of D.C. signal through any series of network leads to well known complications.

Accordingly, it is an object of the invention to provide level stabilizing means whereby correct transmission of a video signal is obtained without the need of a D.C. transmitting feedback network.

It is another object of the invention to provide level stabilizing means whereby correct transmission of the video signal may be obtained in spite of supply voltage variations of 10% in the carrier wave channel and at the modulator.

It is another object of the invention to provide level stabilizing means whereby correct transmission of a television signal may be obtained without stabilisation of the supplies of the carrier channel of the transmitter (carrier generator, modulator and amplifiers).

According to the main feature of the invention a compensation of the carrier wave amplitude modulation is provided by negative feedback by means of a series of control pulses, amplitude modulated by a nil or zero method according to the slow modulation of the blanking level in the radiated television signal.

According to a preferred embodiment of the invention the frequency of the control pulses is constant and equal to the line scanning frequency; the duration of the pulses is longer than the duration of the back porch of the line blanking pulses used with the same video signals.

Figure 3:
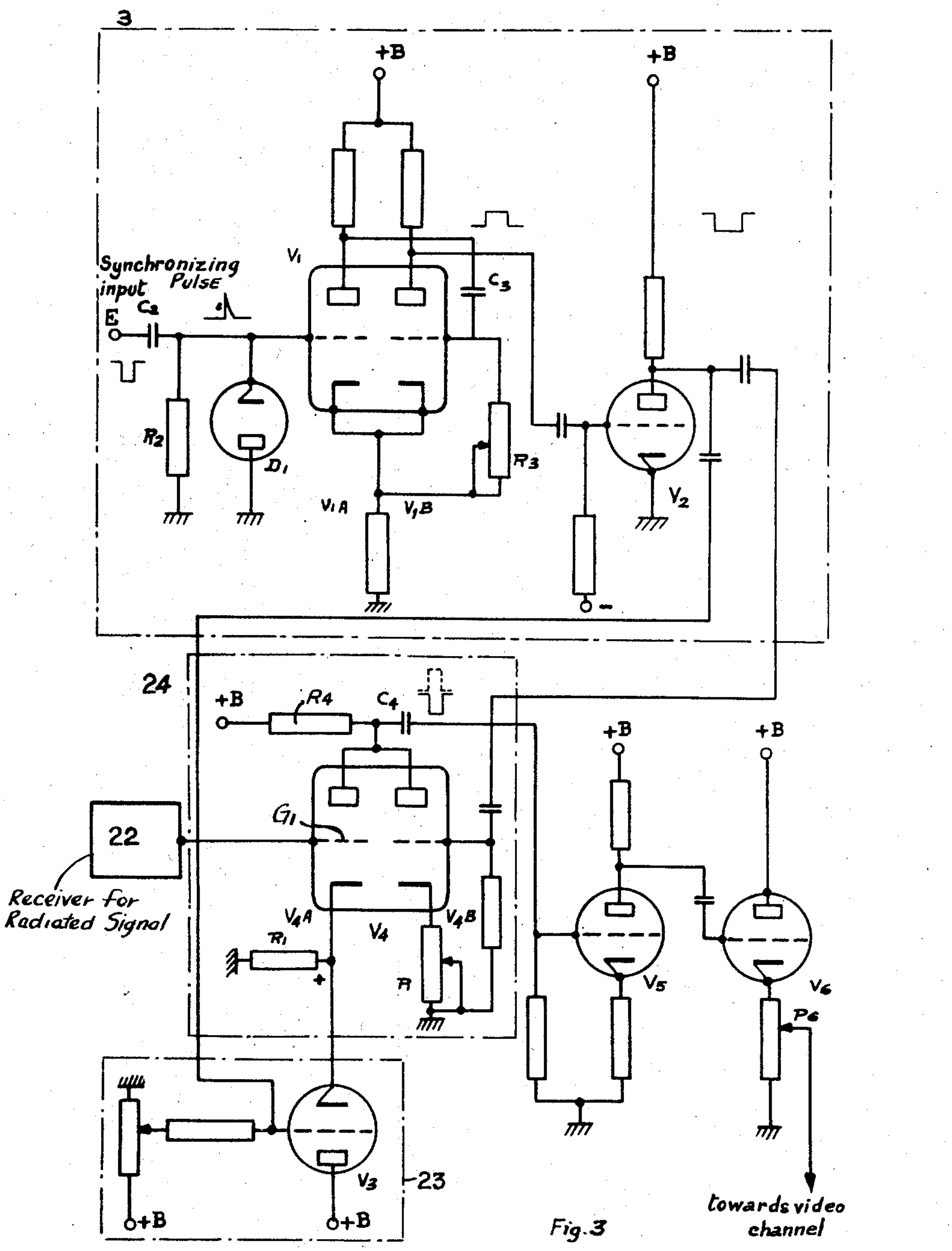

The invention will be understood by reference to the following description and the accompanying drawings drawings among which Figue 2 is a block diagramm of a television transmitter and Figure 3 is the wiring diagramm of the feedback control circuit for amplitude stabilization of the carrier wave.

Figure 2:
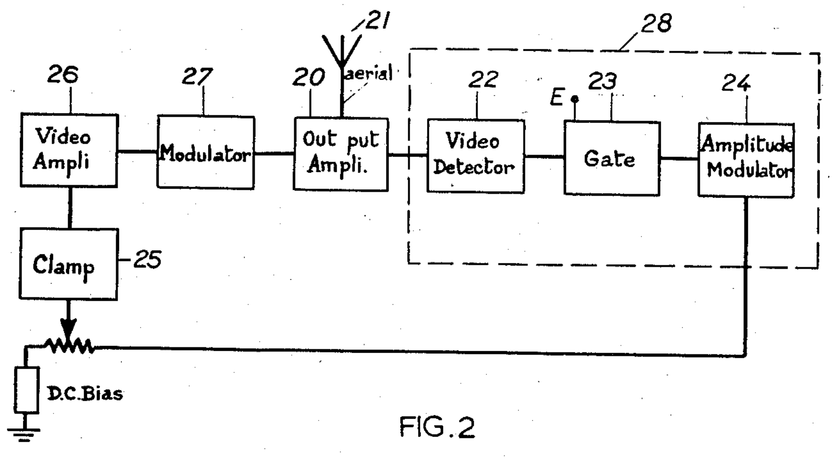

Figure 2 shows the power carrier frequency amplifier 20 which feeds aerial 21 directly or through a side band rejection filter not shown. The radiated signal is rectified by circuit 22 of the feedback channel. The output from circuit 22 reproduces the modulation of the carrier wave. It corresponds either to curve $1_B$ or $1_C$ of Figure 1. Rectified signal is transmitted by means of gate 23 to the measurement network 24. Gate 23 is opened during the blanking back porch such as A, B of Figure 1 by means of control pulses shown on curve $1_D$ of Figure 1. Measurement network 24 delivers amplitude modulated control pulses which are directly used as control signal in a D.C. reinserting network 25 of stage 26 of the video channel of the transmitter. It will be supposed that coupling between the video stage 26 and the carrier frequency modulator 27 is a D.C. transmitting coupling.

The only elements which are used for the feedback control are network 22, 23 and 24 placed in the interrupted line rectangle 28. The other circuits, which have just been referred to, belong to the transmitter. The D.C. reinserting network 25 consists in a bidirectional clamper controlled by means of clamping pulses in phase but slightly shorter than control pulses A, B of curve $1_D$ of Figure 1. Such a circuit is fully described for instance in U.S. Patent to Karl R. Wendt No. 2,299,945.

Figure 3 is a detailed wiring diagram of the circuits which are included in rectangle 28. The carrier frequency radiated television signal is rectified in the video rectifier 22 which comprises an ordinary vacuum diode or a semi-conductor diode. The output video signal is transmitted to the control grid $G_1$ of the left hand side of a double triode $V_4$ shown as $V_{4A}$. Stage $V_4$ is the measuring network 24 of Figure 2. The left hand element $V_{4A}$ of tube $V_4$ is normally cut-off owing to the positive bias voltage applied to its cathode by resistor $R_1$ in which flows the anodic current of tube $V_3$ which is normally conducting. Tube $V_3$ constitutes with tube $V_1$ and $V_2$, the electronic gate 23 which will make stage $V_{4A}$ conducting during time intervals A, B of Figure 1D. Actually negatively polarised pulses with the correct duration and phasing are delivered by a flip flop circuit comprising tubes $V_1$ and $V_2$ so as to cut-off $V_3$ during time intervals A, B. When $V_3$ is cut-off, the cathode potential of the left hand element $V_{4A}$ is equal to earth potential and the tube becomes conducting. The operation of gate circuit 23 is as follows. Line synchronizing signals, delivered by the line synchronizing generator, are applied at input E and transmitted by means of the differentiating circuit $C_2$, $R_2$ to control grid $G_1$ of the left hand element of tube $V_1$. Diode $D_1$ which is connected in shunt with resistor $R_2$ is intended to short circuit negative pulses resulting from the differentiation of the leading edge of the pulsed synchronizing signal applied at E input. Both elements of tube $V_1$ are interconnected as a Schmitt trigger circuit such as described in the "Journal of Scientific Instrument," 1938 XV, page 24, Thermionic Trigger, controlled by the positive pulse applied to grid $G_1$ of $V_{1A}$. The duration of the positive pulse delivered across load impedance of $V_{1B}$ tube is determined by the time constant of the circuits associated to $V_{1A}$ and $V_{1B}$ and especially to the time constant $C_3$, $R_3$. It is chosen longer than the actual duration of the line blanking back porch. However, since gate 23 is triggered by the lagging edge of the synchronizing pulses, the leading edge of these gating pulses is in phase with usual clamping pulses.

The output pulses from gate 23 are shown on curve $1_D$. The polarity of the output pulse from trigger $V_1$ is inverted in amplifier $V_2$. The negative pulse output from $V_2$ has sufficient amplitude to cut-off $V_3$. The measurement network 24 comprises stage $V_{4B}$ connected in shunt with element $V_{4A}$. The steady bias voltages on this tube are preset so that the tube is normally conducting. The output current from $V_{4B}$ is such that when $V_{4A}$ is cut off, the normal output current from $V_{4B}$ is equal to the current which flows through $V_{4A}$ when this element is conducting and receives a signal the amplitude of which corresponds to nominal black level. In other words the output current through $V_{4B}$ is equal to the current which would flow through $V_{4A}$ if the amplitude of the back porch of the video signal delivered by diode 22 were correct. That is to say if there were no amplitude modulation on the carrier wave. The gating pulses of curve $1_D$ delivered by amplifier $V_2$ are simultaneously applied to the grid $G_1$ of tube $V_3$ so as to cut-off this normally conducting tube and to the control grid $G_1$ of right hand element $V_{4B}$ so as to cut-off this tube also. Accordingly, left element $V_{4A}$ is conducting during pulses of curve $1_D$ and the output current of $V_4$ stage is modulated according to the amplitude of the video signal delivered by diode 22 during time interval A, B. Normally, tube $V_{4A}$ is blocked and tube $V_{4B}$ conductive. When the gate pulses from 23 are applied to the grid of $V_{4B}$, this tube is blocked and the voltage appearing at terminals of resistor $R_4$ corresponds to that of the nominal black level chosen as a reference as described above and gate pulses from 23 are applied to the grid of tube $V_{4B}$ so that this tube is blocked and, accordingly, tube $V_{4A}$ conducts. This tube $V_{4A}$ receives on its control grid the radiated signal from 22 during the time determined by the gate pulses of 23. According to the amplitude of this signal, the current flowing through resistor $R_4$ causes the voltage existing at the terminals of this resistor to drop so that the resulting voltage appears as the difference between the nominal black level and the black level of the radiated signal and may be either positive or negative. The output voltage across load resistor $R_4$ is proportional to the difference in the currents flowing respectively through $V_{4B}$ and $V_{4A}$. This output voltage appears as a pulsed voltage of duration equal to time interval A, B, which is either positive or negative. The absolute value of this pulse is directly related to the difference of the currents flowing through each of the elements of tube $V_4$. This pulse constitutes a measurement of the actual black level by reference to an arbitrarily preset level which is fixed by the values of the D.C. bias voltages on tube $V_{4B}$. The control pulse across resistor $R_4$ is transmitted by means of coupling condenser $C_4$ to stage $V_5$ which is only a 180° outphasing circuit and which feeds the cathode follower stage $V_6$. The load $P_6$ of voltage $V_6$ is a potentiometer the moving arm of which is connected to the D.C. reinserting network 25 of the video channel amplifier 26. The efficiency of the feedback control is adjustable by moving the arm of $P_6$.

What we claim is:

1. In a television system having a video transmitter channel, an arrangement for stabilizing the blanking level of the transmitted radio frequency signal comprising, means controlled by the radiated video signal for producing control pulses repeated at the frequency of the synchronizing pulses means to amplitude modulate said control pulses according to the absolute value of the difference between a nominal or reference black level and the black level of the radiated carrier wave, and means for feeding-back said control pulses to said video channel.

2. In a television system having a video transmitter channel, an arrangement for stabilizing the blanking level of the transmitted signal comprising, means controlled by the radiated signal for producing control pulses having their leading edges synchronized with the rear edges of the line synchronizing pulses and of a duration longer than the back porch of the television signal, means for modulating the amplitude of said control pulses in accordance with variations in the amplitude of the radiated carrier wave to obtain difference control pulses, and means for supplying said difference control pulses to the video channel.

3. In a television system having clamping means in a video transmitter channel, an arrangement for stabilizing the blanking level of the transmitted signal comprising, means controlled by the radiated video signal for producing control pulses in synchronism with the clamping pulses applied to said clamping means, said control pulses being amplitude modulated according to variations in the amplitude of the radiated carrier wave to obtain difference control pulses, and means for supplying said difference control pulses to said clamping means.

4. In a television system having clamping means in a video transmitter channel, an arrangement for stabilizing the blanking level of the transmitted signal comprising, means controlled by the transmitted synchronizing pulses for producing gating pulses synchronized with the clamping pulses applied to said clamping means, gating means controlled jointly by said gating pulses and by the radiated televison signal for producing control pulses in synchronism with said gating pulses and of an amplitude dependent upon the difference between the amplitude of the actual black level of the television carrier wave and a nominal or reference black level, and means for supplying said control pulses to said clamping means.

5. In a television system having D.C. reinsertion means in a video transmitter channel, an arrangement for stabilizing the blanking level of the transmitted signal comprising, means controlled by the transmitted synchronizing pulses for producing gating pulses synchronized with and of longer duration than the back porch intervals of the television signal, detector means rectifying the transmitted carrier wave and producing a modulating signal varying in accordance with amplitude variations of said carrier wave, a balanced modulator controlled jointly by said gating pulses and by said modulating signal for producing control pulses in synchronism with said gating pulses and of an amplitude and polarity dependent upon direction and extent of change of the amplitude of said modulating signal from a given value, and means for supplying said control pulses to said D.C. reinsertion means.

6. In a television system for transmitting a video modulated carrier and having a video amplifier, a modulator and an output amplifier for feeding the modulated carrier to a transmission means, means for rectifying the modulated carrier, means responsive to the detected carrier signal for producing a pulse at least during the interval of the back porch of the synchronizing signal and of an amplitude which is the difference between the nominal or reference black level and the black level of the modulated carrier, and means for applying said difference-amplitude pulse to the video amplifier channel in direction tending to maintain the black level at said nominal value.

References Cited in the file of this patent

UNITED STATES PATENTS

| | | |
|---|---|---|
| 2,190,753 | Browne | Feb. 20, 1940 |
| 2,295,330 | Blumlein | Sept. 8, 1942 |
| 2,307,375 | Blumlein | Jan. 5, 1943 |
| 2,445,040 | Schade | July 13, 1948 |
| 2,706,220 | Schlesinger | Apr. 12, 1955 |

FOREIGN PATENTS

| | | |
|---|---|---|
| 514,993 | Belgium | July 23, 1954 |